United States Patent
Araki et al.

(10) Patent No.: US 8,400,039 B2
(45) Date of Patent: Mar. 19, 2013

(54) OUTER ROTOR MOTOR AND METHOD OF MANUFACTURING THE SAME

(75) Inventors: Shintarou Araki, Shiga (JP); Akio Yamagiwa, Shiga (JP)

(73) Assignee: Daikin Industries, Ltd., Osaka (JP)

(*) Notice: Subject to any disclaimer, the term of this patent is extended or adjusted under 35 U.S.C. 154(b) by 142 days.

(21) Appl. No.: 12/446,254

(22) PCT Filed: Oct. 22, 2007

(86) PCT No.: PCT/JP2007/070565
§ 371 (c)(1),
(2), (4) Date: Apr. 20, 2009

(87) PCT Pub. No.: WO2008/056532
PCT Pub. Date: May 15, 2008

(65) Prior Publication Data
US 2010/0314954 A1    Dec. 16, 2010

(30) Foreign Application Priority Data
Nov. 6, 2006 (JP) .................. 2006-300194

(51) Int. Cl.
*H02K 21/12* (2006.01)

(52) U.S. Cl. ............... 310/156.12; 310/67 R

(58) Field of Classification Search ............ 310/67 R, 310/156.26, 89, 90, 156.12, 156.13; *H02K 21/22*
See application file for complete search history.

(56) References Cited

U.S. PATENT DOCUMENTS

| | | | |
|---|---|---|---|
| 5,095,238 A * | 3/1992 | Suzuki et al. | 310/156.46 |
| 5,220,227 A * | 6/1993 | Ohi | 310/156.43 |
| 5,532,531 A * | 7/1996 | Sakamoto | 310/49.53 |
| 5,796,548 A * | 8/1998 | Hans et al. | 360/99.08 |
| 5,880,545 A * | 3/1999 | Takemura et al. | 310/90 |
| 6,081,058 A * | 6/2000 | Suzuki et al. | 310/156.45 |
| 6,396,177 B1 | 5/2002 | Shin et al. | |
| 6,836,044 B2 * | 12/2004 | Ando et al. | 310/156.38 |
| 6,998,757 B2 * | 2/2006 | Seguchi et al. | 310/266 |

(Continued)

FOREIGN PATENT DOCUMENTS

| | | |
|---|---|---|
| CN | 1077824 A | 10/1993 |
| CN | 2744047 Y | 11/2005 |

(Continued)

OTHER PUBLICATIONS

STIC Translations, JP 58-22571, DC Brushless Motor, Apr. 5, 2012.*

*Primary Examiner* — Tran Nguyen
*Assistant Examiner* — Thomas Truong
(74) *Attorney, Agent, or Firm* — Birch, Stewart, Kolasch & Birch, LLP

(57) ABSTRACT

An outer rotor motor comprises a rotor rotating about an axis, and a fixed stator. Provided over the inner peripheral surface of a cylindrical part of a fan connecting resin member are a ring-shaped yoke, a ring-shaped rotor magnet fixed to a fixing slot defined in the radially inner surface of the yoke, and yokes fixed to fixing slots defined in a radially inner surface of the rotor magnet. The rotor magnet is so magnetized that magnetic poles alternately change in a circumferential direction. The yoke covers a radially outer surface of the rotor magnet, and parts on a radially outer side of an axially upper surface and an axially lower surface of the rotor magnet.

2 Claims, 7 Drawing Sheets

U.S. PATENT DOCUMENTS

| | | |
|---|---|---|
| 7,541,708 B2 * | 6/2009 | Ishikawa et al. ............... 310/90 |
| 2004/0140725 A1 * | 7/2004 | Takahashi ................ 310/156.21 |
| 2005/0099080 A1 * | 5/2005 | Matsumoto et al. ..... 310/156.26 |
| 2006/0131975 A1 | 6/2006 | Lee et al. |
| 2006/0158060 A1 * | 7/2006 | Ishikawa et al. ............. 310/261 |
| 2007/0236099 A1 * | 10/2007 | Kim et al. .................... 310/266 |

FOREIGN PATENT DOCUMENTS

| | | |
|---|---|---|
| CN | 1797904 A | 7/2006 |
| JP | 58-22571 A | 2/1983 |
| JP | 10-178752 A | 6/1998 |
| JP | 2000-4551 A | 1/2000 |
| JP | 2000-116039 A | 4/2000 |
| JP | 2001-244110 A | 9/2001 |
| JP | 2004-222342 A | 8/2004 |
| JP | 3580878 B2 | 10/2004 |
| JP | 2005-198447 A | 7/2005 |
| KR | 10-0314009 b1 | 10/2001 |

\* cited by examiner

F I G. 5
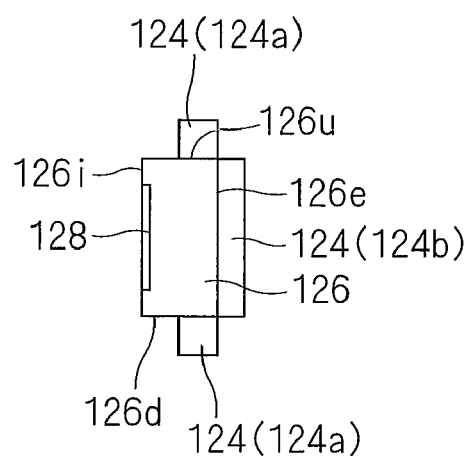
F I G. 6
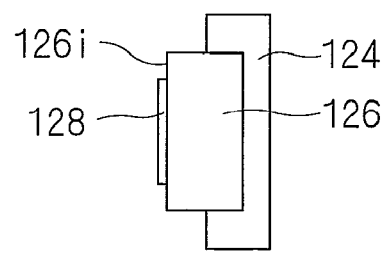

OUTER ROTOR MOTOR AND METHOD OF MANUFACTURING THE SAME

TECHNICAL FIELD

The present invention relates to an outer rotor motor and a method of manufacturing the same.

BACKGROUND ART

FIG. 10 is a perspective view showing the structure of main part of a conventional outer rotor motor 9.

As shown in FIG. 10, the outer rotor motor 9 comprises a ring-shaped rotor magnet 926 with magnetic poles alternately changing in a circumferential direction, and a ring-shaped yoke 924 covering the radially outer surface of the rotor magnet 926. The outer rotor motor 9 further comprises a stator having a stator core 942 with coils wound around teeth 9422 that extend radially and outwardly in all directions, while facing a radially inner surface 926i of the rotor magnet 926 at their ends.

Patent publications 1 to 3 are prior art documents relating to a conventional outer rotor motor, and disclose a technique of covering the radially outer surface of a rotor magnet with a yoke.

Patent Publication 1: Japanese Patent Publication No. 3580878

Patent Publication 2: Japanese Patent Application Laid-Open No. 2005-198447

Patent Publication 3: Japanese Patent Application Laid-Open No. 2001-244110

Unlike an inner rotor motor, in the outer rotor motor 9, a gap between the radially inner surface 926i of the rotor magnet 926 and the ends of the teeth 9422 is exposed to the outside. Thus, unless particular countermeasures are taken such as provision of a cover for shielding the gap from the outside or reduction of an area of a path leading from the outside to the gap, a foreign material such as iron powder attracted by leakage flux may intrude into the gap in the outer rotor motor 9. Such a foreign material may cause an unusual noise during operation.

Leakage flux generated in the outer rotor motor 9 is discussed with reference to FIGS. 11 and 12. FIG. 11 is a schematic view showing the rotor magnet 926 and the stator core 942 when viewed inwardly in the radial direction. FIG. 12 is a schematic view showing the rotor magnet 926, a yoke 924, the stator core 942 and a coil 944 when viewed in the circumferential direction.

In the outer rotor motor 9, there is leakage flux LM which goes out of one magnetic pole to enter another magnetic pole of an axially upper surface 926u and an axially lower surface 926d of the rotor magnet 926 as shown in FIG. 11. In the outer rotor motor 9, there is also leakage flux LM which goes out of a periphery of the radially inner surface 926i of the rotor magnet 926 to enter the axially upper surface 926u or the axially lower surface 926d of the rotor magnet 926 as shown in FIG. 12. These leakage fluxes LM become noticeable, especially when the width in the axial direction of the rotor magnet 926 is extended to such a degree that the opposite ends of the rotor magnet 926 in the axial direction reach points near coil ends of the coils 944 wound around the teeth 9422.

DISCLOSURE OF INVENTION

In an outer rotor motor, the present invention is intended to reduce such leakage flux to effectively avoid the intrusion of a foreign material such as iron powder without any particular countermeasures discussed above.

According to a first aspect of an outer rotor motor (1) of the present invention, the outer rotor motor comprises: a rotor (12) having a ring-shaped rotor magnet (126) with magnetic poles alternately changing in a circumferential direction, and a yoke (124) for covering a radially outer surface (126e) and part on a radially outer side of an axially-directed surface (126u, 126d) of the rotor magnet (126); and a stator (14) having teeth (1422) that face a radially inner surface (126i) of the rotor magnet (126), and coils (144) wound around each said teeth.

According to a second aspect of the outer rotor motor (1) of the present invention, in the outer rotor motor of the first aspect, the yoke (124) as a single piece uninterruptedly covers a successive area extending from the radially outer surface (126e) to the axially-directed surface (126u, 126d) on the radially outer side.

According to a third aspect of the outer rotor motor (1) of the present invention, in the outer rotor motor of the first or second aspect, the rotor magnet (126) is formed from a plastic magnet.

According to a first aspect of a method of manufacturing an outer rotor motor (1) of the present invention, the method comprises: a step (S101) of integrating a ring-shaped rotor magnet (126) and a yoke (124) for covering a radially outer surface (126e) and a radially outer side of an axially-directed surface (126u, 126d) of the rotor magnet (126); and a step (S102) of magnetizing the rotor magnet (126) in such a way that magnetic poles alternately change in a circumferential direction, concurrently with or after the integration of the rotor magnet and the yoke (124).

The first aspect of the outer rotor motor of the present invention reduces leakage flux, thereby effectively avoiding the intrusion of a foreign material such as iron powder.

The second aspect of the outer rotor motor of the present invention further reduces leakage flux, thereby more effectively avoiding the intrusion of a foreign material such as iron powder.

According to the third aspect of the outer rotor motor of the present invention, the rotor magnet is formed integrally with another member. As a result, the productivity of the outer rotor motor is enhanced.

The first aspect of the method of manufacturing an outer rotor motor of the present invention reduces leakage flux during magnetization. Thus, magnetic flux during magnetization is increased to thereby efficiently magnetize ends of the rotor magnet that are hard to magnetize.

These and other objects, features, aspects and advantages will become more apparent from the following detailed description of the present invention when taken in conjunction with the accompanying drawings.

BRIEF DESCRIPTION OF DRAWINGS

FIGS. 5 and 6 are schematic views showing the rotor magnet and the yokes when viewed in the circumferential direction;

BEST MODE FOR CARRYING OUT THE INVENTION

1 Schematic Configuration of Outer Rotor Motor 1

Figure 1:
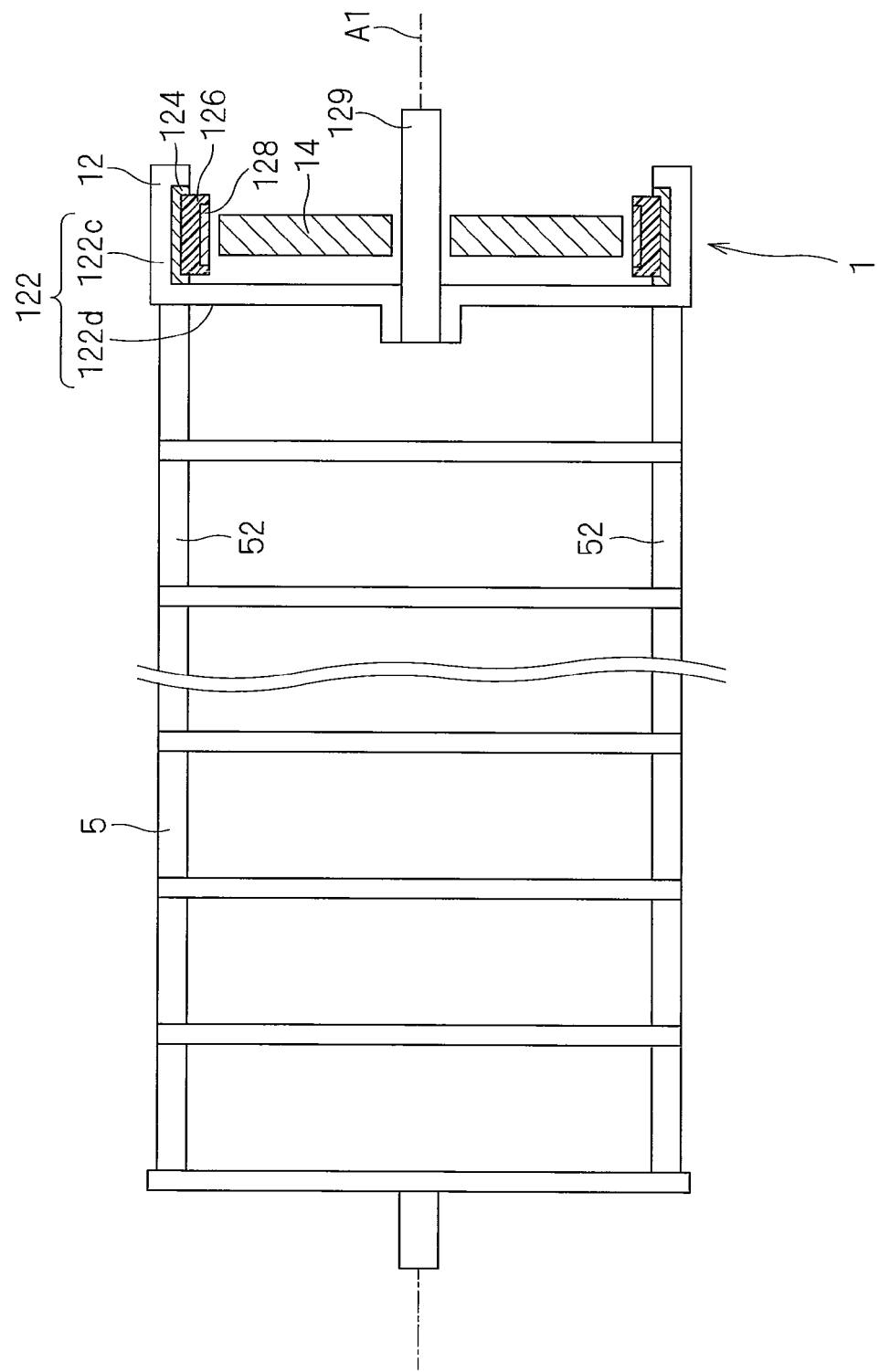
FIG. 1 is a sectional view showing the schematic structure of an outer rotor motor, and a cross-flow fan for use in an indoor unit of a room air conditioner rotated by the outer rotor motor according to a preferred embodiment of the present invention.
Figure 2:
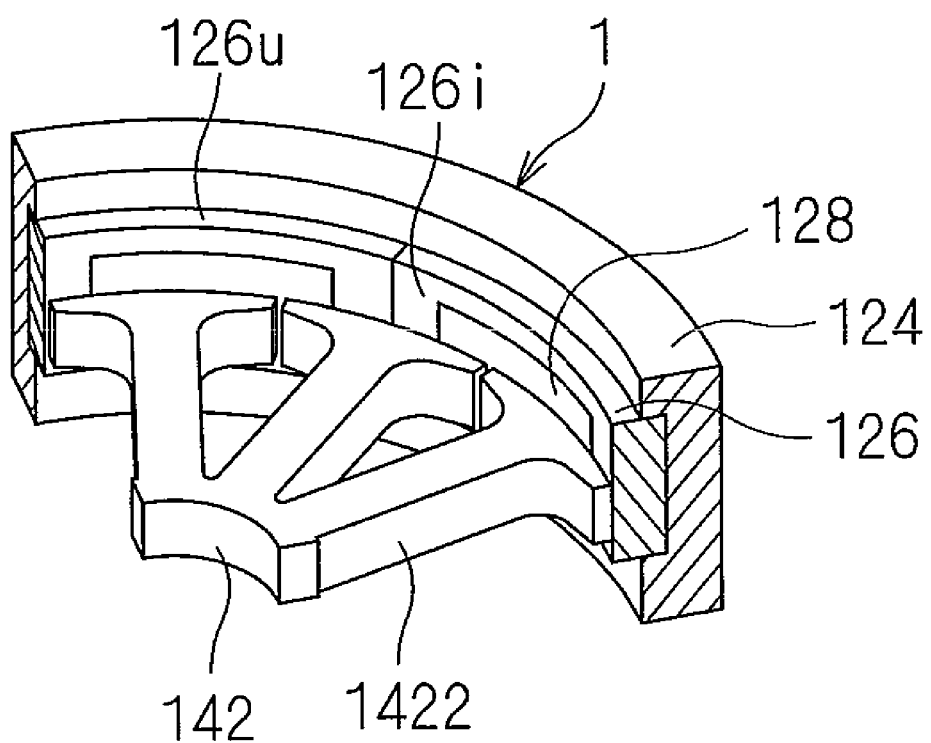
FIG. 2 is a perspective view showing the structure of main part of the outer rotor motor.

FIG. 1 is a sectional view showing the schematic structure of an outer rotor motor 1, and a cross-flow fan 5 for use in an indoor unit of a room air conditioner rotated by the outer rotor motor 1 according to a preferred embodiment of the present invention. FIG. 2 is a perspective view showing the structure of main part of the outer rotor motor 1.

With reference to FIGS. 1 and 2, the outer rotor motor 1 comprises a rotor 12 rotating about an axis A1, and a fixed stator 14.

The rotor 12 has a cup-shaped fan connecting resin member 122, including a cylindrical part 122c with a cylindrical axis coinciding with the axis A1, and a circular disk part 122d perpendicular to the axis A1. The fan connecting resin member 122 is made of a non-magnetic resin.

Provided over the inner peripheral surface of the cylindrical part 122c are a ring-shaped yoke 124, a ring-shaped rotor magnet 126 fixed to a fixing slot defined in the radially inner surface of the yoke 124, and yokes 128 fixed to fixing slots defined in a radially inner surface 126i of the rotor magnet 126. The yoke 124 is made of a magnetic substance such as iron. The rotor magnet 126 is so magnetized that magnetic poles alternately change in a circumferential direction. The rotor magnet 126 is formed from a plastic magnet made by binding magnetic powder by resin. This is because, if the rotor magnet 126 is formed from a plastic magnet, the fan connecting resin member 122, the yoke 124 and the rotor magnet 126 can be integrally formed by injection molding. Of course, the rotor magnet 126 is not necessarily formed from a plastic magnet when the integral molding is not set as a precondition. The fixing slot in the rotor magnet 126 is defined for each magnetic pole.

A shaft 129 extending in the direction of the axis A1 is fixed to the center of the circular disk part 122d. The shaft 129 is rotatably held by a shaft receiver. The circular disk part 122d is also operative to function as an end plate for fixing a plurality of blades 52 of the cross-flow fan 5 at their ends. Accordingly, the outer rotor motor 1 and the cross-flow fan 5 are directly coupled without the intervention of the shaft 129, by which space between the outer rotor motor 1 and the cross-flow fan 5 is eliminated to thereby downsize an air blower module including the outer rotor motor 1 and the cross-flow fan 5.

The stator 14 is stored in the cylindrical part 122c. The stator 14 has: a stator core 142 with teeth 1422 extending radially and outwardly in all directions, while facing the radially inner surface 126i of the rotor magnet 126 at their ends; and a coil 144 (not shown in FIGS. 1 and 2, see FIG. 4 discussed later) wound around each of the teeth 1422. The ends of the teeth 1422 expand in the circumferential direction in order to increase flux linkage. The stator core 142 is made of a magnetic substance such as iron. The coil 144 may be wound either by concentrated winding or by distributed winding.

In the outer rotor motor 1, when current is supplied to the coil 144, armature flux responsive to the current supplied is excited. Then, field magnetic flux and the excited armature flux interlink with each other to generate a torque, by which the rotor 12 rotates about the axis A1.

For example, the number of magnetic poles of the rotor magnet 126 is eight and the number of teeth 1422 is 12. Of course, these numbers may be suitably increased or decreased.

2 Yoke 124

Figure 3:
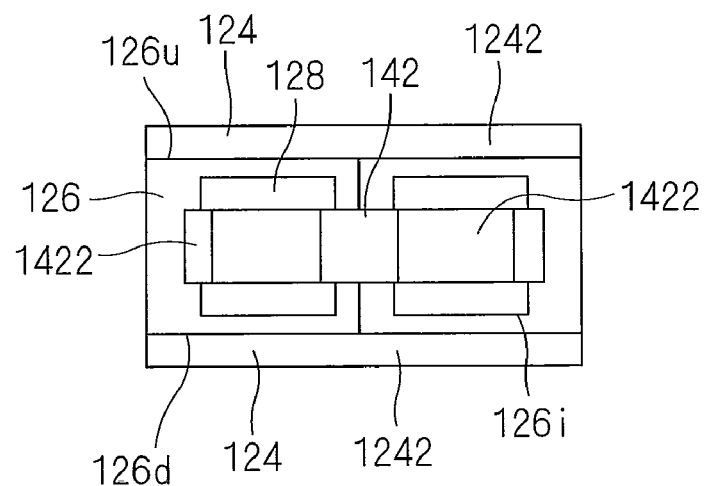
FIG. 3 is a schematic view showing a rotor magnet, yokes and a stator core when viewed inwardly in a radial direction.
Figure 4:
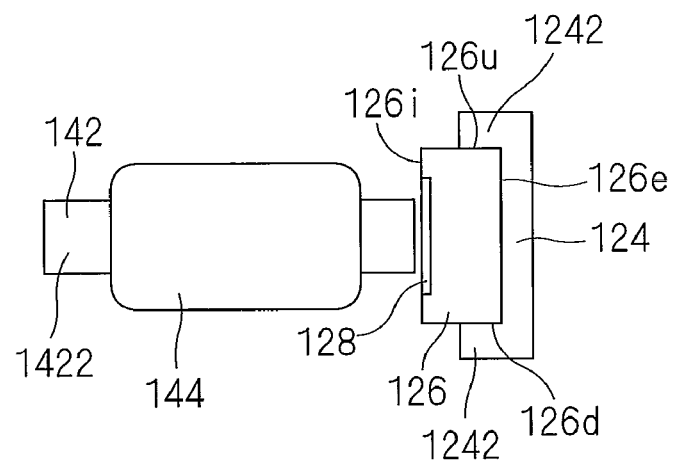
FIG. 4 is a schematic view showing the rotor magnet, the yokes, the stator core and a coil when viewed in a circumferential direction.

The yoke 124 is discussed next with reference to FIGS. 3 and 4. FIG. 3 is a schematic view showing the rotor magnet 126, the yokes 124, 128 and the stator core 142 when viewed inwardly in the radial direction. FIG. 4 is a schematic view showing the rotor magnet 126, the yokes 124, 128, the stator core 142 and the coil 144 when viewed in the circumferential direction.

As shown in FIGS. 3 and 4, the yoke 124 covers a radially outer surface 126e of the rotor magnet 126. This causes the yoke 124 to function as a back yoke for lowering magnetic reluctance of magnetic flux after going out of one magnetic pole of the radially outer surface 126e of the rotor magnet 126 and before entering another magnetic pole.

Further, the rotor magnet 126 is fixed to the fixing slot of the yoke 124 shallower than the thickness of the rotor magnet 126, by which the yoke 124 covers parts on the radially outer side of an axially upper surface 126u and an axially lower surface 126d of the rotor magnet 126. Accordingly, magnetic flux going out of one magnetic pole to enter another magnetic pole of the axially upper surface 126u and the axially lower surface 126d of the rotor magnet 126 passes through the yoke 124, thereby reducing leakage flux axially escaping from the rotor magnet 126.

Figure 9:
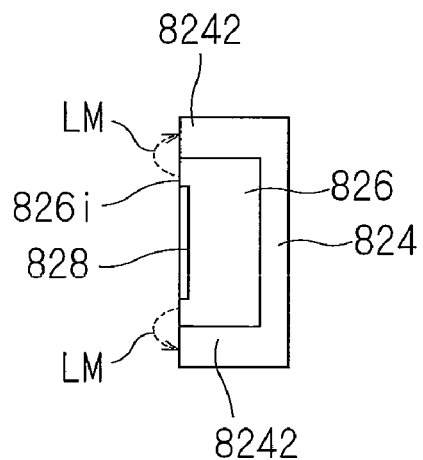
FIG. 9 is a schematic view showing a rotor magnet and yokes when viewed in a circumferential direction.
Figure 10:
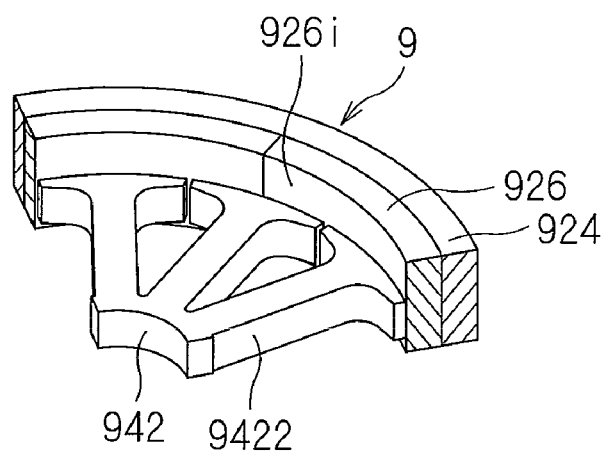
FIG. 10 is a perspective view showing the structure of main part of a conventional outer rotor motor.
Figure 11:
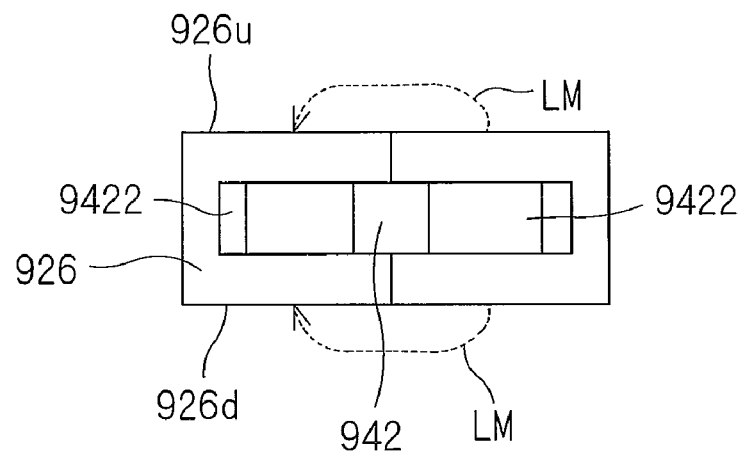
FIG. 11 is a schematic view showing a rotor magnet and a stator core when viewed inwardly in a radial direction.
Figure 12:
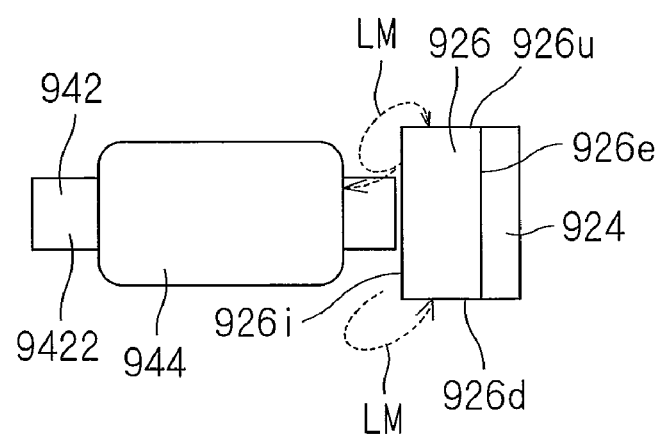
FIG. 12 is a schematic view showing the rotor magnet, a yoke, the stator core and a coil when viewed in a circumferential direction.

Here, "parts on the radially outer side" are intended to prevent edges of a protrusion 1242 projecting inwardly in the radial direction at an axially upper end and an axially lower end of the yoke 124 from reaching the radially inner surface 126i of the rotor magnet 126, by which the edges of the protrusion 1242 are prevented from covering the axially upper surface 126u and the axially lower surface 126d in their entirety. As shown in FIG. 9, when a protrusion 8242 reaches a radially inner surface 826i of a rotor magnet 826, a periphery of the radially inner surface 826i of the rotor magnet 826 and an edge of the protrusion 8242 come close to each other. This causes magnetic flux going out of the periphery of the radially inner surface 826i of the rotor magnet 826 to move toward the edge of the protrusion 8242 of the yoke 824 to generate different leakage flux LM. Like FIG. 4, FIG. 9 is a schematic view showing the rotor magnet 826, and the yokes 824, 828 when viewed in the circumferential direction.

Areas of the axially upper surface 126u and the axially lower surface 126d that are covered by the yoke 124 are not specifically limited unless "entire areas" thereof are covered. However, leakage flux is effectively reduced especially when "halves" on the radially outer side are covered.

In FIGS. 1 to 4, the yoke 124 as a single piece is shown to uninterruptedly cover a successive area extending from the radially outer surface 126e to the axially upper surface 126u and axially lower surface 126d on the radially outer side of the rotor magnet 126. This is most desirable in terms of reducing leakage flux. Alternatively, the yokes 124 (124a) for covering the axially upper surface 126u and axially lower surface 126d and the yoke 124 (124b) for covering the radially outer surface 126e may be separately provided. This also reduces leakage flux, so the present invention also encompasses the form of the yoke 124 shown in FIG. 5. Like FIG. 4, FIG. 5 is a schematic view showing the rotor magnet 126, and the yokes 124, 128 when viewed in the circumferential direction.

The outer rotor motor 1 with the yoke 124 discussed above reduces leakage flux, so the intrusion of a foreign material such as iron powder is effectively avoided without any particular countermeasures.

<Yokes 128>

The yokes 128 are discussed next with reference to FIGS. 3 and 4.

As shown in FIGS. 3 and 4, the yokes 128 cover parts of the center of the radially inner surface 126i of the rotor magnet 126. This causes magnetic flux going out of a periphery of the radially inner surface 126i of the rotor magnet 126 to move toward the center to thereby reduce leakage flux in the radial direction.

Areas of the radially inner surface 126i to be covered by the yokes 128 are not specifically limited. However, if these areas are slightly wider than areas that face the ends of the teeth 1422, leakage flux is reduced while flux linkage is increased.

Figure 7:
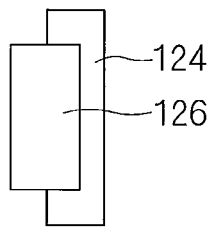
FIG. 7 is a schematic view showing the rotor magnet and the yoke when viewed in the circumferential direction of the outer rotor motor without the yoke.

In FIGS. 1 to 4, the yokes 128 are shown to be fixed to fixing slots. Alternatively, the formation of the fixing slots may be omitted and the yokes 128 may be directly fixed by an adhesive upon the radially inner surface 126i of the rotor magnet 126 as shown in FIG. 6. Still alternatively, the formation of the yoke 128 is not an absolute necessity. The present invention also encompasses the outer rotor motor 1 that includes only the yoke 124 and does not include the yokes 128 as shown in FIG. 7. Like FIG. 4, FIG. 6 is a schematic view showing the rotor magnet 126, and the yokes 124, 128 when viewed in the circumferential direction. Like FIG. 4, FIG. 7 is a schematic view showing the rotor magnet 126 and the yoke 124 when viewed in the circumferential direction.

4 Method of Manufacturing Outer Rotor Motor 1

A method of manufacturing the outer rotor motor 1 is discussed next with particular attention to the steps of manufacturing the rotor 12.

Figure 8:
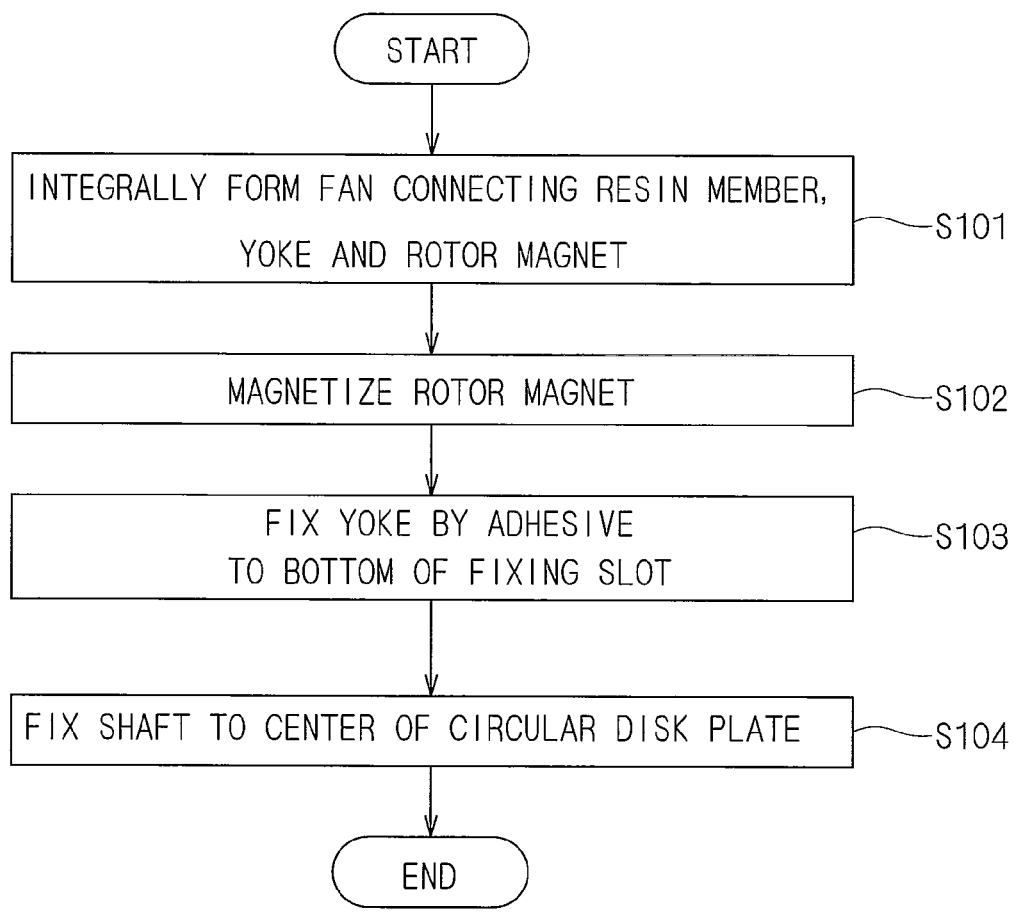
FIG. 8 is a flow chart explaining a method of manufacturing the outer rotor motor.

As shown in the flow chart of FIG. 8, for the manufacture of the rotor 12, the fan connecting resin member 122, the yoke 124 and the rotor magnet 126 are integrally formed first by injection molding (step S101). The rotor magnet 126 is at the same time magnetized (step S102). As the rotor magnet 126 is magnetized with the rotor magnet 126 and the yoke 124 integrated, leakage flux during magnetization is reduced. This increases magnetic flux during magnetization, so that ends of the rotor magnet 126 that are hard to magnetize are efficiently magnetized.

Thereafter the yokes 128 are fixed by an adhesive to the bottoms of fixing slots defined in the radially inner surface 126i of the rotor magnet 126 by an adhesive (step S103), and the shaft 129 is fixed to the center of the circular disk part 122d (step S104), by which the rotor 12 is completed.

The magnetization of the rotor magnet 126 along with the integral formation of the fan connecting resin member 122, the yoke 124 and the rotor magnet 126 is most desirable in terms of enhancing the productivity of the outer rotor motor 1. The magnetization of the rotor magnet 126 may be performed after the integration of the fan connecting resin member 122, the yoke 124 and the rotor magnet 126. This also reduces leakage flux during magnetization, so that magnetic flux during magnetization is still increased to thereby efficiently magnetize ends of the rotor magnet 126 that are hard to magnetize.

A different process of manufacturing the rotor 12 may include: (1) forming only the rotor magnet 126 by injection molding and magnetizing the rotor magnet 126 concurrently; (2) press-fitting the magnetized rotor magnet 126 thereafter into a fixing slot defined in the radially inner surface of the yoke 124; (3) integrally forming the fan connecting resin member 122, the yoke 124 and the rotor magnet 126; and (4) as a final step, fitting the yokes 128 into the bottoms of fixing slots defined in the radially inner surface 126i of the rotor magnet 126.

5 Others

An object to be rotated by the outer rotor motor 1 of the present invention is not necessarily the cross-flow fan 5 for use in an indoor unit of a room air conditioner. An object to be rotated may be other types of fans such as a propeller fan. Further, the present invention is also applicable to an outer rotor motor such as a spindle motor for a hard disk drive for rotating an object other than a fan.

While the invention has been shown and described in detail, the foregoing description is in all aspects illustrative and not restrictive. It is therefore understood that numerous modifications and variations can be devised without departing from the scope of the invention.

The invention claimed is:

1. An outer rotor motor, comprising:
    a rotor having a ring-shaped rotor magnet with magnetic poles alternately changing in a circumferential direction, and a yoke for covering a radially outer surface of said rotor magnet and partially covering a first axially-directed surface and a second axially-directed surface of said rotor magnet on a radially outer side, said first and second axially-directed surfaces being located at opposite axially-directed ends of said rotor magnet, respectively; and
    a stator having teeth that face a radially inner surface of said rotor magnet, and coils wound around each side teeth, wherein
    the rotor includes a resin member having a cylindrical part with the yoke provided over an inner peripheral surface of the cylindrical part,
    the rotor magnet is fixed to a fixing slot defined in a radially inner surface of the yoke,
    a radially outer surface of the yoke and entire surfaces of both axially-directed surfaces of the yoke are covered with the resin member,
    said resin member does not cover a part of said first axially-directed surface and said second axially-directed surface of said rotor magnet, and
    said yoke as a single piece uninterruptedly covers a successive area extending from said radially outer surface to said first and second axially-directed surfaces on the radially outer side.

2. The outer rotor motor according to claim 1, wherein said rotor magnet is formed from a plastic magnet.

* * * * *